United States Patent [19]

Pennink

[11] Patent Number: 4,721,313

[45] Date of Patent: Jan. 26, 1988

[54] ANTI-EROSION LABYRINTH SEAL

[75] Inventor: Hans Pennink, Clifton Park, N.Y.

[73] Assignee: Atlas Copco Comptec, Inc., Voorheesville, N.Y.

[21] Appl. No.: 906,752

[22] Filed: Sep. 12, 1986

[51] Int. Cl.⁴ ............................................. F16J 15/447
[52] U.S. Cl. ........................................ 277/53; 277/24; 277/3
[58] Field of Search .............................. 277/24, 53–57, 277/15, 16, 3

[56] References Cited

U.S. PATENT DOCUMENTS

| | | | |
|---|---|---|---|
| 2,846,245 | 8/1958 | Weaver | 277/53 X |
| 3,610,775 | 7/1969 | Swearingen | |
| 4,513,975 | 4/1985 | Hauser et al. | 277/53 X |

FOREIGN PATENT DOCUMENTS 433898  9/1926  Fed. Rep. of Germany ........ 277/56

Primary Examiner—Robert S. Ward
Attorney, Agent, or Firm—Bruns and Wall

[57] ABSTRACT

An erosion resistant labyrinth seal for use in a rotating machine, such as a turbine or a compressor, that has bleed holes formed in the labyrinth cavities for carrying away erosion producing contaminants entrained in a controlled flow of fluid passing through the seal. Material removed from the flow is vented away from the seal.

15 Claims, 3 Drawing Figures

ANTI-EROSION LABYRINTH SEAL

BACKGROUND OF THE INVENTION

This invention relates to rotating machines and in particular, to erosion resistant labyrinth seals for use in rotating machines.

As is well known in the art, labyrinth seals of the type generally employed in rotating machines, such as turbines, power expanders, compressors, pumps and the like, are highly susceptible to erosion. This is particularly true where the machine is processing dirty gases that contain a relatively high percentage of solids or other contaminants. A labyrinth seal, as the name implies, contains a series of labyrinth-like cavities which function to entrap a working fluid between a moving component of the machine and a stationary component. The fluid thus creates a barrier that isolates a high pressure region within the machine from a region of lower pressure.

Under the influence of the rotating machine component, the working fluid in the seal cavity is rotated at relatively high speed and any solids entrained in the fluid is hurdled by centrifugal force against the exposed surfaces of the seal. This along with the high operating temperature experienced by the seal and the corrosive effect of many working fluids leads to rapid erosion of exposed seal surfaces and early seal failure. Accordingly, seals of this type must be replaced often. Labyrinth seals, because of the very nature the job must perform, are generally positioned about the rotor assembly deep within the machine. To replace the seal the entire machine generally must be dismantled and rebuilt. This, of course, is a time consuming and costly procedure.

SUMMARY OF THE INVENTION

It is therefore a primary object of the present invention to improve labyrinth seals by extending the life of the seal.

It is a further object of the present invention to provide a labyrinth seal that practically eliminates erosion.

Yet a further object of the present invention is to provide a labyrinth seal that exhibits long life when exposed to dirty working fluids containing high amounts of solid contaminants.

Another object of the present invention is to reduce the amount of down time experienced by a rotating machine due to labyrinth seal failures.

These and other objects of the present invention are attained by a labyrinth seal assembly that is mounted between a moving and a stationary component of a rotating machine for establishing a fluid barrier therebetween. The seal assembly includes a body section that is attached to the stationary component having spaced teeth that project radially toward the moving component to establish a series of labyrinth cavities between adjacent teeth. The seal body contains an internal passage that passes beneath the cavities. A bleed hole(s) is located at the bottom of each cavity which connects the cavity and the passage. Dirt and other particulate contaminants entrained in the working fluid are centrifugally driven into the bleed holes and conducted to the passage. A venting mechanism draws the dirt or particles from the passage and removes them from the seal region whereby erosion of the seal teeth is considerably reduced thus extending the life of the seal.

BRIEF DESCRIPTION OF THE DRAWING

For a better understanding of these and other objects of the invention reference is had to the following detailed description of the invention which is to be read in conjunction with the accompanying drawing, wherein.

DESCRIPTION OF THE INVENTION

Figure 1:
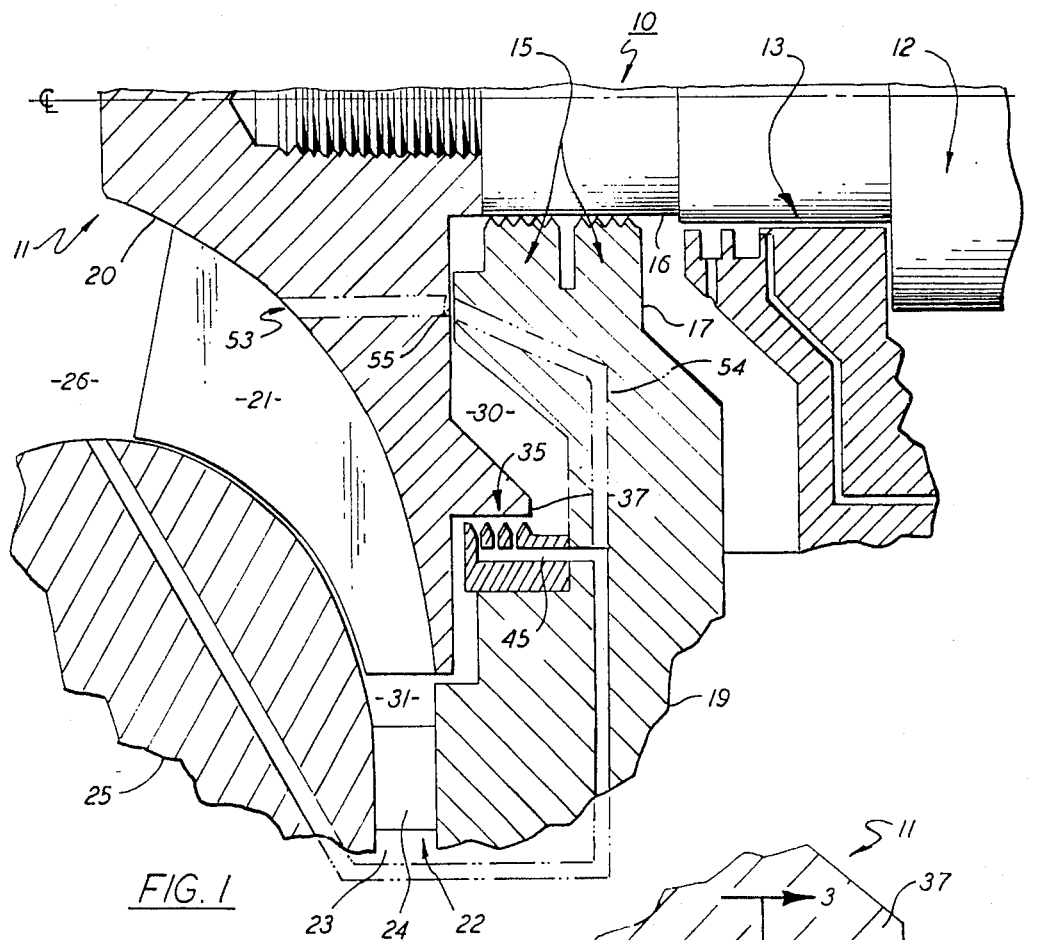
FIG. 1 is a partial view in section of a turbine containing a labyrinth seal assembly embodying the teachings of the present invention.

Turning now to the drawings, and in particular to FIG. 1, there is shown a partial view of a turbine, generally referenced 10, having a turbine wheel 11 that is secured to a rotor shaft 12. The shaft is mounted for rotation between bearing units, one of which is depicted at 13. A seal assembly 15 provides a barrier at the shaft 16 to isolate the high pressure turbine wheel region from regions of lower pressure. The body 17 of the seal is integral with the main casing 19 of the machine. The bearing unit 13 and seal assembly 15 can be of any suitable design as known and used in the art and are shown here simply for illustrative purposes.

The turbine wheel 11 includes a central hub 20 that is threaded onto the end of shaft 12. A series of spaced moving blades 21 are secured about the hub to establish a series of passages therebetween for conducting a working fluid through the wheel. A nozzle ring 22 surrounds the entrance region 23 to the moving blade passages. The nozzle ring contains a plurality of fixed or movable blades 24 that are arranged to direct high pressure fluid, which is typically a liquid, vapor or gas, at the turbine blades causing the wheel, and thus the rotor structure, to turn. The fluid is expanded as it moves through the turbine wheel passages thus imparting further energy to the rotor. This energy is converted to work at the output of the shaft. The turbine wheel is enclosed within a shroud 25 which forms the outer wall of the blade passages. Fluid leaving the turbine wheel is carried out of the machine, or to a second stage, by means of an exhaust diffuser 26.

Although the present invention shall be described in detail with reference to a turbine, it should become apparent to one skilled in the art that the invention has wider applicability and can be utilized effectively in many other types of rotating machines such as compressors, pumps, power expanders and the like. As previously noted, these machines are oftentimes required to handle gases that are byproducts of a relatively dirty process. As a consequence, the fluids entering the machine may be highly contaminated with entrained solids which can erode exposed machine surfaces such as the teeth of the labyrinth seals usually employed in this type of machine.

Figure 2:
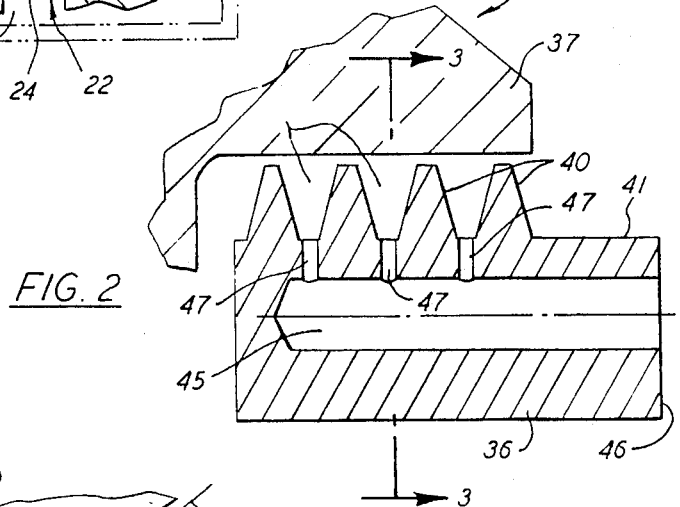
FIG. 2 is an enlarged view in section showing the lower portion of the labyrinth seal assembly illustrated in FIG. 1.

A balancing chamber 30 is located behind the hub of the turbine wheel 11 which functions in a well known manner to apply an axial force against the rotor structure to compensate for, or offset, axial loads that tend to unbalance the rotor. A portion of the high pressure fluid being directed by the nozzles into the entrance region 23 of the turbine wheel is allowed to leak into the balancing chamber through labyrinth seal assembly 35. The seal assembly includes a stationary sleeve or annular body section 36 (FIG. 2) that is secured in the machine casing 19, as shown in FIG. 1. The seal teeth coact with an axial extended shoulder 37 which is integral with the wheel hub to provide a space therebetween through which the high pressure working fluid is metered into the balancing chamber. Although not shown, the balancing chamber has a control system associated therewith that is used to adjust the pressure maintained within the chamber to minimize axial thrust on the rotor structure.

The labyrinth seal assembly further includes a series of radially extended annular teeth 40—40 which are attached to the inside wall 41 of the body section 36. The teeth are axially spaced to provide labyrinth cavities 43—43 between adjacent teeth. A hole or passage 45 is drilled or otherwise formed through the right hand end face 46 of the body as viewed in FIGS. 1 and 2. Bleed holes 47—47 are further formed in the housing at the bottom of each cavity which place the cavity in fluid flow communication with the passage. The bleed holes are of small diameter while the passage 45 is of substantially greater diameter.

Figure 3:
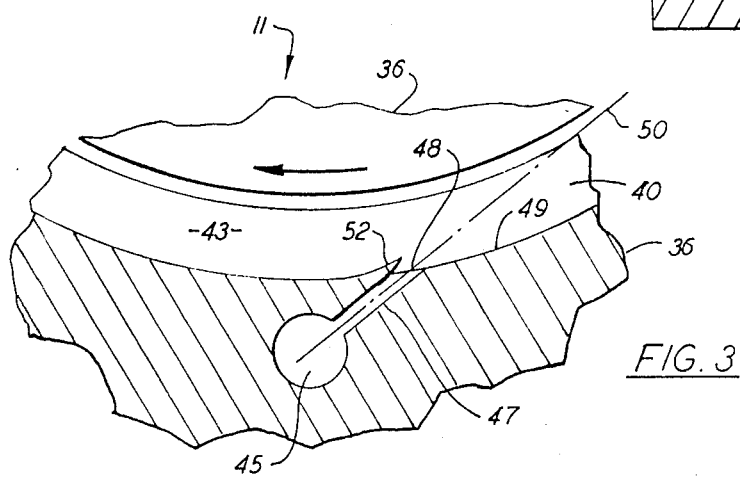
FIG. 3 is a view taken along lines 3—3 in FIG. 2.

As further illustrated in FIG. 3, the entrance 48 to each bleed hole is preferably located at about the lowest elevation along the periphery of the outer wall 49 of each labyrinth cavity. Each bleed hole is further formed at an angle, or incline with regard to the horizontal plane.

In assembly, the central axis 50 of the bleed hole may be inclined so that it is close to being tangent with the opposing outer surface of the moving shoulder on the turbine wheel to align the entrance 48 of the bleed hole in opposition to the direction of wheel rotation. A raised lip 52 may be added at the back or downstream side of the bleed hole entrance. The lip encompasses between 90 and 180 degrees of the entrance region and extends upwardly into the labyrinth cavity whereby the lip will intercept entrained particles in the fluid stream and direct them into the bleed hole. In practice the lip is formed by upsetting or coining the sleeve body material surrounding the entrance to the bleed hole.

In operation, solids or other contaminants entrained in the flow of working fluid, are moved by centrifugal force toward the outside wall 49 of each labyrinth cavity. Under the influence of the rotating wheel, the particles are given a tangential velocity and thus move circumferentially towards the bleed hole along the bottom of the groove. The contaminants are thus driven by the flow into the entrance of the bleed hole, and are conducted directly into the internal passage 45 with a minimum of impaction upon the outer working surfaces of the seal. The integrity of the seal teeth are thus preserved and the operating life of the seal is considerably extended when compared to other seals operating under similar conditions.

The internal passage 45 contained in the seal body beneath the labyrinth cavities is vented to an area of lower pressure. Exposing the passage to a source of lower pressure has a twofold effect in that it places a suction pressure on the bleed holes thus helping to draw contaminants out of the cavities, and also serves to remove the contaminants collected in the passage out of the seal area. Venting is achieved in the present embodiment of the invention by placing the passage in fluid flow communication with the diffuser at the exit region of the turbine wheel, which is at a much lower pressure. As illustrated in FIG. 1, an enclosed flow channel referenced 55 extends from the side wall entrance to the passage 45 to the diffuser region 26. The flow channel is arranged to pass around or through the machine casing 19, span across or through the nozzle ring 22 and the shroud 25 and opens into the diffuser at some point downstream from the turbine wheel 11 whereby particulate material drawn from the seal region is carried out of the machine with the discharge flow. It should be clear to one skilled in the art that the flow channel used to vent the passage 45 may be coupled to an external suction pump that is arranged to draw material from the passage, and dispose of them at some remote location.

As shown in phantom outline in FIG. 1, the seal passage 45 may be connected to the low pressure diffuser region 26 by an alternative venting system. A series of through holes 53 are passed axially through the turbine wheel at suitable locations. A connecting hole 54 is cross drilled into the casing to the vent passage. The opening 55 of the cross drilled hole is placed in close proximity with the entrances of holes 53 whereby the passage is placed in fluid flow communication with the low pressure difuser section to apply a suction pressure on the passage as the wheel rotates for venting the seal. Although the seal body 36 is shown mounted on the stationary component of the seal assembly, it can be similarly mounted on the hub or moving component of the assembly without departing from the teachings of the invention. Similarly, a plurality of spaced apart passages can be formed in the seal body with each passage being separately connected to the labyrinth cavities by its own set of bleed holes. The inclination of the bleed holes in regard to the center of the seal assembly may also be varied from a position wherein the axis of each hole is radially aligned with the seal axis to a position wherein the axis of each hole is about tangent with the outside surface of the opposing seal component. The diameter of annular seal teeth may also be stepped to further enhance the operation of the seal.

While this invention has been described with specific reference to the above-noted method, it should be clear to one skilled in the art that the invention is not limited by this disclosure.

I claim:

1. An anti-erosion gas seal assembly that includes a rotating seal component mounted upon a moving member of a rotating machine and stationary seal component mounted upon a fixed member of the machine to establish a gas barrier between two different pressure regions within the machine, said seal further including an annular body mounted on one of the components having a plurality of spaced apart teeth projected toward the other component to form a series of labyrinth cavities between adjacent teeth whereby gas moves centrifugally within the cavities, said annular body having an enclosed passage positioned beneath the cavities, a series of bleed holes connecting each of the cavities with the passage, each bleed hole being positioned to capture solids entrained in said centrifugal gas flow and direct the solids into said passage, and venting means for connecting the passage with a remote zone outside the seal area whereby gas entrained solids captured in the passage are conducted away from the seal into said remote zone.

2. The seal assembly of claim 1 wherein the annular body is secured to the stationary seal component and each bleed hole is inclined in opposition to the direction of rotation of the rotating component to position the axis of the bleed hole substantially tangent with the centrifugal flow of gas moving through the labyrinth cavity.

3. The seal assembly of claim 2 wherein the entrance to each bleed hole contains a raised lip positioned downstream with respect to the direction of movemnet of the rotating component for directing, gas entrained solids moving in an adjacent cavity into said bleed hole.

4. The seal assembly of claim 1 wherein said passage is a blind chamber passing into the body of the seal through one sidewall of the body.

5. The seal assembly of claim 1 wherein said venting means includes a channel for placing the passage in fluid flow communication with a zone of low pressure within the machine. said zone being at a pressure that is lower than the pressure within said cavities whereby a suction pressure is applied to said passage.

6. The seal assembly of claim 2 wherein the entrance to each bleed hole is located along the outer peripheral wall of the cavity in one or more locations.

7. The seal assembly of claim 3 wherein said lip is formed by upsetting the material surrounding the bleed hole entrance.

8. An anti-erosion gas seal assembly for controlling the flow of a gas from a high pressure region within a rotating machine into a balancing chamber, said machine including a rotating wheel having a hub that forms one wall of the balancing chamber, a horizontally disposed, rotating seal component secured to the hub that faces a stationary seal component secured to the machine casing, an annular seal body secured to one of the components, spaced annular teeth extending radially from said seal body adjacent the other component to form a series of labyrinth cavities between the teeth whereby gas moves centrifugally within the cavities, said annular body having at least one enclosed internal passage positioned beneath the labyrinth cavities and a series of bleed holes connecting each of the cavities with the said passage, each bleed hole being positioned to capture solids entrained in said centrifugal gas flow and direct the solids into said passage, and a venting channel connecting the passage with a low pressure zone within the machine that is remote from the seal whereby a suction pressure is applied to the passage to conduct gas entrained solid from said passage into said remote low pressure zone.

9. The seal assembly of claim 8 wherein the bleed holes are inclined in opposition to the direction of rotation of the moving seal component.

10. The seal assembly of claim 8 wherein the seal body is mounted upon the stationary seal component and the axis of the bleed holes are aligned in regard to the moving component anywhere between a radial position or a position tangent with the outer periphery of the moving component.

11. The seal assembly of claim 8 wherein the seal body contains a plurality of passages each of which is connected to the labyrinth cavities by bleed holes.

12. The seal assembly of claim 10 wherein the entrance to each bleed hole contains a raised lip positioned downstream with respect to the direction of movement of the moving component for directing particles moving in an adjacent cavity into the bleed holes.

13. The seal assembly of claim 8 wherein said passage is a blind chamber passing into the body of the seal through one sidewall of said body.

14. The seal assembly of claim 10 wherein the entrance to each bleed hole is located at about the lowest elevation along the outer peripheral wall of the cavity.

15. The seal assembly of claim 12 wherein said lip is formed surrounding the bleed hole entrance.

* * * * *